US007739087B2

(12) United States Patent
Qiu

(10) Patent No.: US 7,739,087 B2
(45) Date of Patent: Jun. 15, 2010

(54) METHOD AND DEVICE FOR ANALYING COLLISION DRIVING DATA

(75) Inventor: Qiang Qiu, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 1290 days.

(21) Appl. No.: 10/655,955

(22) Filed: Sep. 4, 2003

(65) Prior Publication Data

US 2004/0122639 A1 Jun. 24, 2004

(30) Foreign Application Priority Data

Sep. 4, 2002 (DE) ................................ 102 40 838

(51) Int. Cl.
*G06G 7/48* (2006.01)
*G06G 7/70* (2006.01)
*G06G 7/78* (2006.01)
*G06F 19/00* (2006.01)
*G08G 1/16* (2006.01)
*G08G 1/00* (2006.01)

(52) U.S. Cl. ............................ 703/8; 701/35; 701/301; 340/901; 340/903; 340/945; 340/953; 340/961; 342/29; 342/41; 342/455; 434/385

(58) Field of Classification Search ..................... 703/8; 701/35; 434/405, 62, 68; 340/901, 903, 340/945, 953–954, 961, 904; 342/29, 41, 342/455
See application file for complete search history.

(56) References Cited

U.S. PATENT DOCUMENTS 5,526,269 A * 6/1996 Ishibashi et al. .............. 701/29
5,581,464 A * 12/1996 Woll et al. .................... 701/35
5,625,556 A * 4/1997 Janky et al. .................... 701/1
5,826,206 A * 10/1998 Nemeth ....................... 701/35
6,246,933 B1 * 6/2001 Bague ......................... 701/35
6,535,804 B1 * 3/2003 Chun .......................... 701/35
6,564,149 B2 * 5/2003 Lai ........................... 701/301
6,675,074 B2 * 1/2004 Hathout et al. ................. 701/1
6,718,239 B2 * 4/2004 Rayner ........................ 701/35
6,748,305 B1 * 6/2004 Klausner et al. .............. 701/35
2002/0103622 A1 * 8/2002 Burge ......................... 702/183

FOREIGN PATENT DOCUMENTS

DE 29 29 168 10/1980
DE 41 32 981 8/1992

OTHER PUBLICATIONS

Fittanto et al. Overview of Carat-4, a Multi-body Simulation and Collision Modeling Program, Society of Automotive Engineers, May 7, 2002, pp. 13-29.*

* cited by examiner

*Primary Examiner*—Kamini S Shah
*Assistant Examiner*—Suzanne Lo
(74) *Attorney, Agent, or Firm*—Kenyon & Kenyon LLP

(57) ABSTRACT

A method and a device are described for acquiring driving data of a vehicle. Moreover, a computer program and a computer program product are put forward for carrying out the method. In the method described, a three-dimensional, kinematic vehicle model is calculated, including linear-motion-dynamics signals and lateral-motion-dynamics signals. This model can be utilized for reconstructing the vehicle movement.

18 Claims, 1 Drawing Sheet

METHOD AND DEVICE FOR ANALYING COLLISION DRIVING DATA

FIELD OF THE INVENTION

The present invention relates to a method and a device for acquiring driving data. The invention also relates to a computer program and a computer program product for carrying out the method.

BACKGROUND INFORMATION

Methods and devices of the type indicated are frequently used to permit reconstruction of the events prior to an accident. The devices, also known as crash recorders (CR), are used as well to recognize accidents and to report accident information automatically to suitable central locations via radio communication network for the purpose of dealing with the accident more quickly.

German Published Patent Application No. 29 29 168 describes a method for acquiring, storing and evaluating driving data of vehicles. Using it, the intention is to reconstruct the speed conditions prior to an accident with great accuracy, without a sharp increase in outlay for storage. This is achieved by continually entering the acquired measured values into an erasable memory.

German Published Patent Application No. 41 32 981 describes a method for reconstructing the movement trajectory of a road vehicle. In this method, the movement of the vehicle prior to an accident event is described as a two-dimensional movement on the roadway surface. It starts from the assumption that during the braking process, the vehicle is moving in a straight line approximately in the direction of the vehicle longitudinal axis. In this case, longitudinal and transverse dynamic values are taken into account.

In the method described, at least two sensors for analog signals, as well as a measured-value acquisition device and a data memory are used. One of the analog signals carries information regarding the speed of the vehicle or its components in the vehicle longitudinal direction. With the assistance of a correlative measuring method, it and the movement of the vehicle are ascertained using a stationary evaluation unit, e.g. a digital computer, by resolution of a differential equation system. In this case, the method permits the detection of slippage-independent traveling speeds.

A disadvantage in the described method is that a new sensor system must be installed extra, and therefore the costs are very high.

In addition, an important disadvantage in known methods is that the vehicle movement is described in modulated fashion as a mass point, not completely as a three-dimensional object in its kinematics, namely translation and rotation.

SUMMARY OF THE INVENTION

In contrast, in the method of the present invention for acquiring driving data of a, a three-dimensional, kinematic vehicle model is calculated, including linear-motion-dynamics signals and lateral-motion-dynamics signals, which may be utilized for reconstructing the vehicle movement. This means that, for example, after an accident, the vehicle movement may be reconstructed accurately and reliably using the acquired data.

It is advantageous if, in addition, a time signal is recorded which is preferably obtained from a high-resolution real-time radio clock.

The linear-motion-dynamics signals advantageously include speed signals of all wheels, for example, from the ABS system, vehicular-speed signals, for example, from wheel sensors, longitudinal-acceleration signals, for example, from a control unit of a front airbag and/or a GPS signal, which, however, is only able to give rough information about the absolute vehicle position.

In the embodiment of the method according to the present invention, the lateral-motion-dynamics signals include rotational-rate signals from a yaw sensor, lateral-acceleration signals of a lateral-acceleration sensor or also of side airbags which likewise supply information concerning the lateral acceleration of the vehicle, and/or steering-angle signals from a steering-angle sensor.

With the aid of the indicated signals, the vehicle movements during an accident may be exactly reconstructed in a three-dimensional, kinematic vehicle model, and also visualized by computer simulation. Moreover, from the kinematics of the vehicle, and specifically, chiefly from acceleration data during an accident, this model is able to calculate the force exerted on the vehicle occupants, and thus the danger of injury for the vehicle occupants.

It is advantageous if, in addition, radar signals of a radar device, e.g. ACC radar signals (ACC: adaptive cruise control, adaptive speed governor) are utilized.

Based on the scattered-back radar signals, the ACC radar signals primarily permit the detection of a change in the relative position of the objects located in the field of vision of the radar. However, using it, it is also possible to determine one's own traveling speed, for example, by the Doppler effect. In particular, if a possibly additional radar is either directed at an angle downward in the direction of the roadway, or if the radar field is enlarged horizontally in width so that stationary objects at the edge of the road are also detected, it is possible to determine the absolute speed of the vehicle, free from slipping, based on the shift in frequency.

The ability of the ACC radar system to determine and to track positions of several objects permits a precise accident analysis. It is thereby possible to analyze in detail the way the accident happened, i.e., for example, the positions of the vehicles involved relative to each other, and the temporal and spatial sequence of the accident may be determined. It is thus possible to determine which of the objects involved caused the accident.

Another advantage compared to correlative measuring methods is that correlation measuring devices are always aligned in the direction of the vehicle floor, and therefore no longer function when the vehicle tilts away, for example, to the side. In comparison, the measuring method using an ACC radar device is more robust and reliable.

In a preferred embodiment of the method according to the present invention, rotational-rate signals of an ESP system are utilized. The rotational-rate sensor of the ESP system supplies the information about how the vehicle is rotating or has rotated about its axis. Particularly when two rotational-rate sensors are provided, which supply the vehicle rotation about the vehicle longitudinal direction and perpendicular thereto, a reconstruction of all important degrees of freedom of kinematic motion of the vehicle are able to be represented with the aid of additional ACC radar signals and acceleration signals. The entire sequences of movements may then also be visualized by computer simulation.

The method of the present invention is particularly suitable to output a message in response to a specific event, e.g. an accident.

The device of the present invention for acquiring vehicle data has a unit for recording linear-motion-dynamics signals and lateral-motion-dynamics signals, as well as a processing unit for calculating a kinematic vehicle model based on the recorded signals. The device is also known as a crash recorder (CR). This model implemented in the CR is a simplified kinematic model of the vehicle.

It is particularly advantageous with respect to the device of the present invention if the measuring signals from a radar device and the rotational-rate sensor are combined with the signals of a high-resolution real-time radio clock which is calibrated via radio and permits a higher resolution due to an internal time circuit or timer. This then represents the absolute time base.

Unconditioned signals of acceleration sensors are preferably used to determine both the direction of the exact exertion of force, as well as the amount of the forces at the moment of the accident. This means that these acceleration signals are not just utilized up to the moment immediately prior to the accident for the reconstruction of the trajectory.

The crash recorder of the present invention is able to recognize an accident automatically, for example, indirectly by triggering of the airbags or directly by a suitable acceleration sensor system, and thus to stop a ring buffer after a programmable lag time. Immediately after the accident, the crash recorder evaluates all necessary information and, in addition to the customary accident data such as position, time of day and vehicle data, preferably outputs a model-supported estimation about the severity of the accident. The rescue service is therefore able to prepare accordingly. The model implemented in the crash recorder is a simplified kinematic model of the vehicle based on the linear-motion-dynamics signals and lateral-motion-dynamics signals. Moreover, the GPS position of the vehicle may be evaluated. The message is advantageously sent directly via a telematic service, e.g. via the vehicle's own Internet connection, to the rescue center near the accident. Thus, valuable time is gained.

The offline evaluation of all crash recorders of the vehicles involved in the accident using an identical real-time base gives more information about the way the accident happened. It is thereby possible to calculate and visualize spatial allocations of the vehicles involved to each other (also in slow motion).

The computer program of the present invention has a program code to carry out all steps of a method described above. The computer program is executed on a computer or a processing unit.

The computer program product of the present invention includes the program code and is stored on a machine-readable data carrier.

Further advantages and refinements of the present invention come to light from the description and the accompanying drawing.

It goes without saying that the features indicated above or yet to be clarified in the following are usable not only in the combination specified in each instance, but also in other combinations or by themselves, without departing from the scope of the present invention.

DETAILED DESCRIPTION

Figure 1:
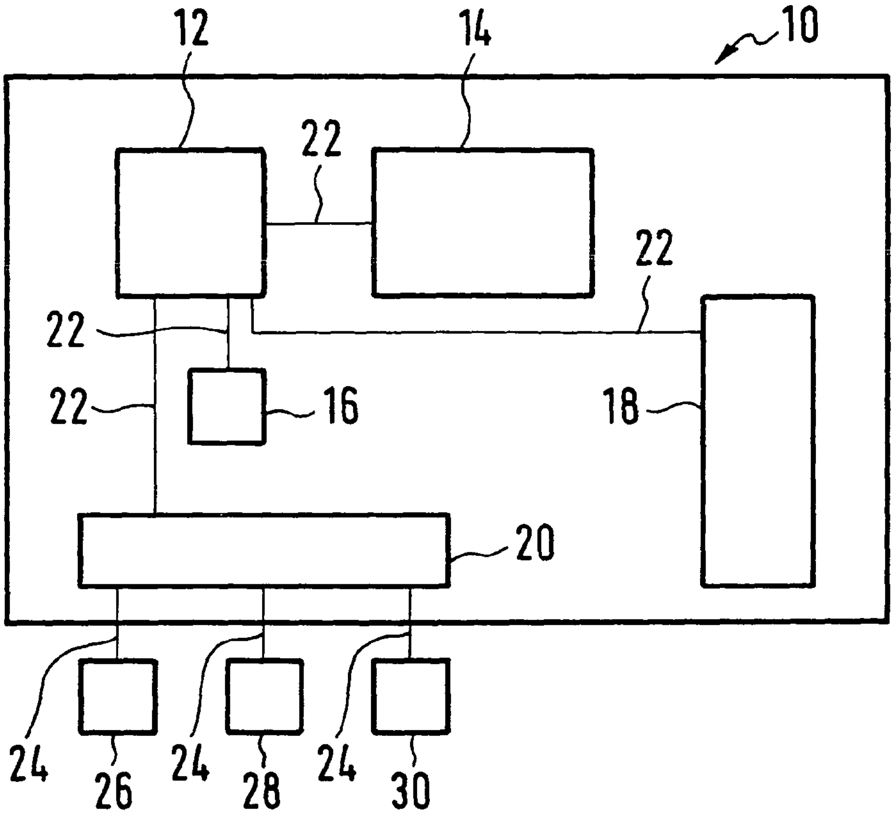
FIG. 1 shows a preferred specific embodiment of the device according to the present invention in schematic representation.

FIG. 1 shows a device of the present invention, a so-called crash recorder, which is designated altogether by reference numeral 10.

Crash recorder 10 has an electronic processing unit 12, a memory device 14, a real-time radio clock 16, a transmission device 18 and an interface 20. The components are interconnected via data lines 22. Interface 20 acquires signals from an ACC radar device 26, a rotational-rate sensor 28 and an acceleration sensor 30 via signal lines 24. These signals are acquired by interface 30 and are used for calculating a kinematic vehicle model with the aid of processing unit 12. The model is stored, and therefore recorded, together with the acquired data in memory device 14. Provision may also be made to record just the acquired data, and to only calculate this model in case of need.

In the event of an accident, a suitable message is transmitted via transmission device 18 to a central location.

The ACC radar signals are used in the manner of an electronic eye of the precise slip-independent speed detection. In this context, both one's own speed and that of the objects located in the shadow field of the sensor are detected. The radar signals also make it possible to detect the real-time distance to a plurality of objects located in the radar field of vision. It is thereby possible to make a very detailed analysis of the way the accident happened. Another advantage compared to correlation measuring devices is that they are always aligned in the direction of the vehicle floor, and therefore no longer function when the vehicle tilts. With ACC radar device 26, this is not a problem, since the radar lobes are aligned forward.

The movement trajectory may be calculated three-dimensionally using the rotational-rate signal from the ESP system. An unrestricted spatial reconstruction is possible with the aid of additional ACC radar signals and acceleration signals, for example, from front and side airbags.

The acceleration signals are used primarily for detecting the vehicle acceleration, both lengthwise and transversely to the direction of travel, as well as the yaw-angle acceleration. These signals deliver a direct measured quantity with respect to severity and direction for the actual impact.

High-resolution real-time radio clock 16 is used as a time base for the model calculation. A comprehensive accident evaluation is possible upon evaluating the crash recorders of all vehicles involved in the accident.

Figure 2:
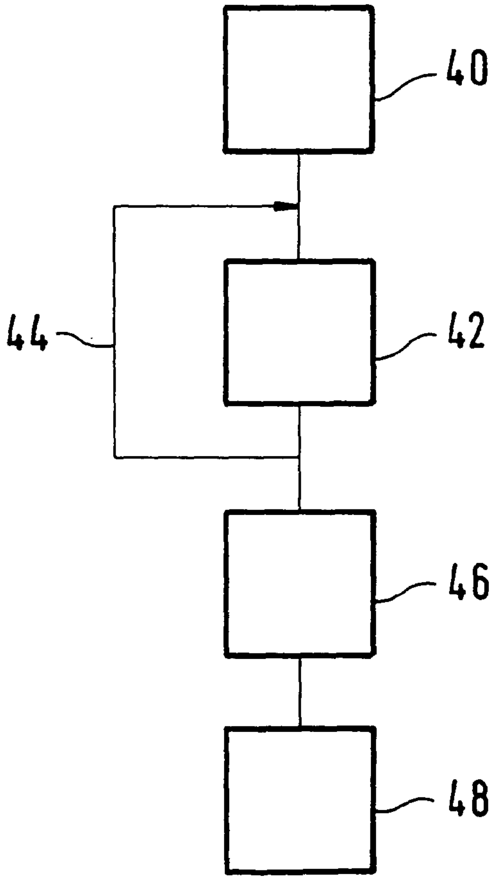
FIG. 2 shows a preferred specific embodiment of the method of the present invention in a flow chart.

FIG. 2 shows in a flow chart a possible sequence of the method according to the present invention. The drive begins in a first step 40, and the recording of linear-motion-dynamics signals and lateral-motion-dynamics signals begins at once in a subsequent step 42. This process runs continuously, as illustrated by arrow 44. In so doing, the detected signals or data are stored, it being useful to erase or overwrite the data after a certain time, in order to limit the memory requirements.

If an accident occurs, in a step 46, a message is sent immediately which permits a first evaluation of the accident and optionally a warning for other road users. Finally, to analyze the accident, in a step 48, based on the acquired data, a kinematic vehicle model is created which allows an exact reconstruction of the way the accident happened. The vehicle model may be created by processing unit 12 provided in crash recorder 10, or by an external processing unit.

The device and the method of the present invention permit rapid and correct legal resolution of the question of fault in accidents. Both the judicial authorities and police, as well as injured persons and insurance companies benefit. It is possible to deal with the accident quickly. In addition, crash recorder 10 supplies important information for automobile manufacturers. Using the information, it is possible to recognize borderline situations for vehicles and therefore avoid them. The manufacturers may use the knowledge gained to develop safer vehicles.

In addition, the analysis of the accident aids in avoiding similar accident situations. In a short time, a higher-level traffic control system is able to send an alarm, for example, via a radio communications network, to all vehicles approaching the location of the accident, and optionally, to intervene in the vehicle control so that the speed of the endangered vehicle is compulsorily throttled. Thus, consequential accidents are avoided. Moreover, the traffic may be better rerouted and guided with the aid of a dynamic traffic navigation system. In this context, modem vehicle sensor systems are used which are already available in many vehicles anyway.

What is claimed is:

1. A method for analyzing driving data of at least two vehicles involved in a collision, comprising:

calculating in a computer a three-dimensional, kinematic model of the at least two vehicles, the model including at least one linear-motion-dynamics signal and at least one lateral-motion-dynamics signal and a radar signal of an adaptive cruise control system of each of the at least two vehicles, wherein the at least one lateral-motion-dynamics signal includes a rotational-rate signal of a yaw sensor, and wherein an identical time basis for the at least one linear-motion-dynamics signal and the at least one lateral-motion-dynamics signal is provided by a real-time clock in each of the two vehicles and recorded, and wherein the radar signal of the adaptive cruise control system and the identical time basis provided by the real-time clocks are utilized to form a frame of reference from which the relative positions of the at least two vehicles are determined; and visually on a display representing the three-dimensional, kinematic model of the at least two vehicles involved in the collision.

2. The method as recited in claim 1, wherein:

the at least one linear-motion-dynamics signal includes at least one of speed signals of all wheels, vehicular-speed signals, longitudinal-acceleration signals, and a GPS signal.

3. The method as recited in claim 1, wherein:

the at least one lateral-motion-dynamics signal further includes at least one of lateral-acceleration signals, and steering-angle signals.

4. The method as recited in claim 1, wherein a rotational-rate signal of an ESP system is utilized as the rotational-rate signal of the yaw sensor.

5. The method as recited in claim 1, further comprising:

outputting a message based on the at least one linear-motion-dynamics signal and the at least one lateral-motion-dynamics signal in response to a predeterminable event.

6. A system for analyzing vehicle data of at least two vehicles involved in a collision, comprising:

a processing unit for calculating a three-dimensional, kinematic model for the at least two vehicles, the model including at least one linear-motion-dynamics signal and at least one lateral-motion-dynamics signal and a radar signal of an adaptive cruise control system of each of the at least two vehicles, wherein the at least one lateral-motion-dynamics signal includes a rotational-rate signal of a yaw sensor, and wherein an identical time basis for the at least one linear-motion-dynamics signal and the at least one lateral-motion-dynamics signal is provided by a real-time clock in each of the two vehicles and recorded, and wherein the radar signal of the adaptive cruise control system and the identical time basis provided by the real-time clocks are utilized to form a frame of reference from which the relative positions of the at least two vehicles are determined; and a display device configured to visually represent the three-dimensional, kinematic model of the at least two vehicles involved in the collision.

7. The system as recited in claim 6, further comprising:

a transmission device for transmitting a message.

8. A computer-readable storage medium storing a computer program that when executed on one of a computer and a processing unit results in a performance of: calculating a three-dimensional, kinematic model for at least two vehicles involved in a collision, the model including at least one linear-motion-dynamics signal and at least one lateral-motion-dynamics signal and a radar signal of an adaptive cruise control system of each of the at least two vehicles, wherein the at least one lateral-motion-dynamics signal includes a rotational-rate signal of a yaw sensor, and wherein an identical time basis for the at least one linear-motion-dynamics signal and the at least one lateral-motion-dynamics signal is provided by a real-time clock in each of the two vehicles and recorded, and wherein the radar signal of the adaptive cruise control system and the identical time basis provided by the real-time clocks are utilized to form a frame of reference from which the relative positions of the at least two vehicles are determined; and visually representing the three-dimensional, kinematic model of the at least two vehicles involved in the collision.

9. The computer-readable storage medium as recited in claim 8, wherein:

the at least one linear-motion-dynamics signal includes at least one of speed signals of all wheels, vehicular-speed signals, longitudinal-acceleration signals, and a GPS signal.

10. The computer-readable storage medium as recited in claim 8, wherein:

the at least one lateral-motion-dynamics signal further includes at least one of lateral-acceleration signals and steering-angle signals.

11. The computer-readable storage medium as recited in claim 8, wherein a rotational-rate signal of an ESP system is utilized as the rotational-rate signal of the yaw sensor.

12. The computer-readable storage medium as recited in claim 8, an execution of the computer program further comprising:

outputting a message based on the at least one linear-motion-dynamics signal and the at least one lateral-motion-dynamics signal in response to a predeterminable event.

13. The method as recited in claim 1, wherein the real-time clocks are automatically calibrated via radio.

14. The method as recited in claim 1, further comprising:

determining, based on the three-dimensional, kinematic model of the at least two vehicles, a force exerted by the collision on an occupant of at least one of the vehicles; and responsive to the determining of the force exerted, transmitting an alert message for delivery to a rescue service, the alert message including an indication of a severity of the collision.

15. The system as recited in claim 6, wherein the real-time clocks are automatically calibrated via radio.

16. The system as recited in claim 6, wherein based on the three-dimensional, kinematic model of the at least two vehicles, a force exerted by the collision on an occupant of at least one of the vehicles is determined, and wherein responsive to the determining of the force exerted, an alert message is transmitted for delivery to a rescue service, the alert message including an indication of a severity of the collision.

17. The computer-readable storage medium as recited in claim 8, wherein the real-time clocks are automatically calibrated via radio.

18. The computer-readable storage medium as recited in claim 8, wherein the program-code when executed on one of the computer and the processing unit results in a performance of:

determining, based on the three-dimensional, kinematic model of the at least two vehicles, a force exerted by the collision on an occupant of at least one of the vehicles; and responsive to the determining of the force exerted, transmitting an alert message for delivery to a rescue service, the alert message including an indication of a severity of the collision.

* * * * *